United States Patent
Lev et al.

(10) Patent No.: US 11,442,871 B2
(45) Date of Patent: *Sep. 13, 2022

(54) SUPPORTING CONCURRENT REMOVE OPERATIONS AND ADD-TO-FRONT OPERATIONS ON A LEAST RECENTLY USED (LRU) QUEUE

(71) Applicant: Oracle International Corporation, Redwood City, CA (US)

(72) Inventors: Yosef Lev, New York, NY (US); David Dice, Foxboro, MA (US); Daniel McNaught Jordan, Winchester, MA (US)

(73) Assignee: Oracle International Corporation, Redwood City, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/079,361

(22) Filed: Oct. 23, 2020

(65) Prior Publication Data

US 2021/0042240 A1 Feb. 11, 2021

Related U.S. Application Data

(63) Continuation of application No. 16/216,898, filed on Dec. 11, 2018, now Pat. No. 10,846,240.

(60) Provisional application No. 62/653,252, filed on Apr. 5, 2018.

(51) Int. Cl.
*G06F 12/122* (2016.01)
*G06F 12/123* (2016.01)
*G06F 16/901* (2019.01)
*G06F 9/50* (2006.01)
*G06F 9/52* (2006.01)

(52) U.S. Cl.
CPC .......... *G06F 12/122* (2013.01); *G06F 9/5077* (2013.01); *G06F 9/52* (2013.01); *G06F 12/123* (2013.01); *G06F 16/9024* (2019.01)

(58) Field of Classification Search
CPC .. G06F 12/122; G06F 12/123; G06F 16/9024; G06F 9/5077; G06F 9/52
See application file for complete search history.

(56) References Cited

U.S. PATENT DOCUMENTS

| | | | |
|---|---|---|---|
| 6,941,308 B1 | 9/2005 | Chilton | |
| 7,039,766 B1 | 5/2006 | Smith | |
| 7,389,291 B1 * | 6/2008 | Shavit | ..................... G06F 9/526 |
| 7,809,891 B2 | 10/2010 | Schreter | |
| 9,684,737 B2 * | 6/2017 | Steinmacher-Burow | ..................... G06F 16/9024 |
| 2001/0047361 A1 * | 11/2001 | Martin | ..................... G06F 7/785 |

(Continued)

OTHER PUBLICATIONS

U.S. Appl. No. 16/216,898, filed Dec. 11, 2018, Yosef Lev, et al.

*Primary Examiner* — Mark A Giardino, Jr.
(74) *Attorney, Agent, or Firm* — Robert C. Kowert; Kowert, Hood, Munyon, Rankin & Goetzel, P.C.

(57) ABSTRACT

A remove operation and an add-to-front operation may be currently performed with respect to nodes in an Least Recently Used (LRU) queue. A remove operation for a node may proceed if a lock can be obtained on the node to be removed and a predecessor node. During the remove operation, an add-to-front operation may proceed if a lock can be obtained on a dummy node that precedes the current front node of the LRU queue.

20 Claims, 10 Drawing Sheets

(56) References Cited

U.S. PATENT DOCUMENTS

2004/0040018 A1* 2/2004 Fleming .............. G06F 12/0269
717/162
2008/0040524 A1* 2/2008 Zimmer ................. G06F 13/24
710/267
2019/0310949 A1 10/2019 Lev et al.

* cited by examiner

SUPPORTING CONCURRENT REMOVE OPERATIONS AND ADD-TO-FRONT OPERATIONS ON A LEAST RECENTLY USED (LRU) QUEUE

RELATED APPLICATIONS

This application is a continuation of U.S. patent application Ser. No. 16/216,898, filed Dec. 11, 2018, which claims benefit of priority to U.S. Provisional Application Ser. No. 62/653,252, filed Apr. 5, 2018, and which are incorporated herein by reference in their entirety.

BACKGROUND

Field of the Disclosure

This disclosure relates generally to performing operations on a Least Recently Used (LRU) queue implemented as a doubly linked list, and more particularly to systems and methods for supporting concurrent removal and add-to-front operations on the LRU queue.

Description of the Related Art

LRU queues are used in different applications, including operating system kernels. Applications that rely heavily upon LRU queues may experience contention when an LRU queue is protected by an individual lock, blocking operations upon the LRU queue until the lock is obtained. Thus, techniques that can alleviate the contention experience by operations on LRU queues are highly desirable.

SUMMARY

Concurrent remove operations and add-to-front operations on a least recently used (LRU) queue may be supported in various embodiments. Remove operations may be optimized to allow add-to-front operations to proceed by locking a node to be removed and a predecessor node, in some embodiments. An add-to-front operation can proceed to add a node to the front of an LRU queue during a remove operation as long as the add-to-front operation can successfully obtain a lock on a current front node of the LRU queue, in some embodiments. In this way, remove operations and add-to-front operations can perform in parallel when not attempting lock the same nodes, in some embodiments.

Figure 1:
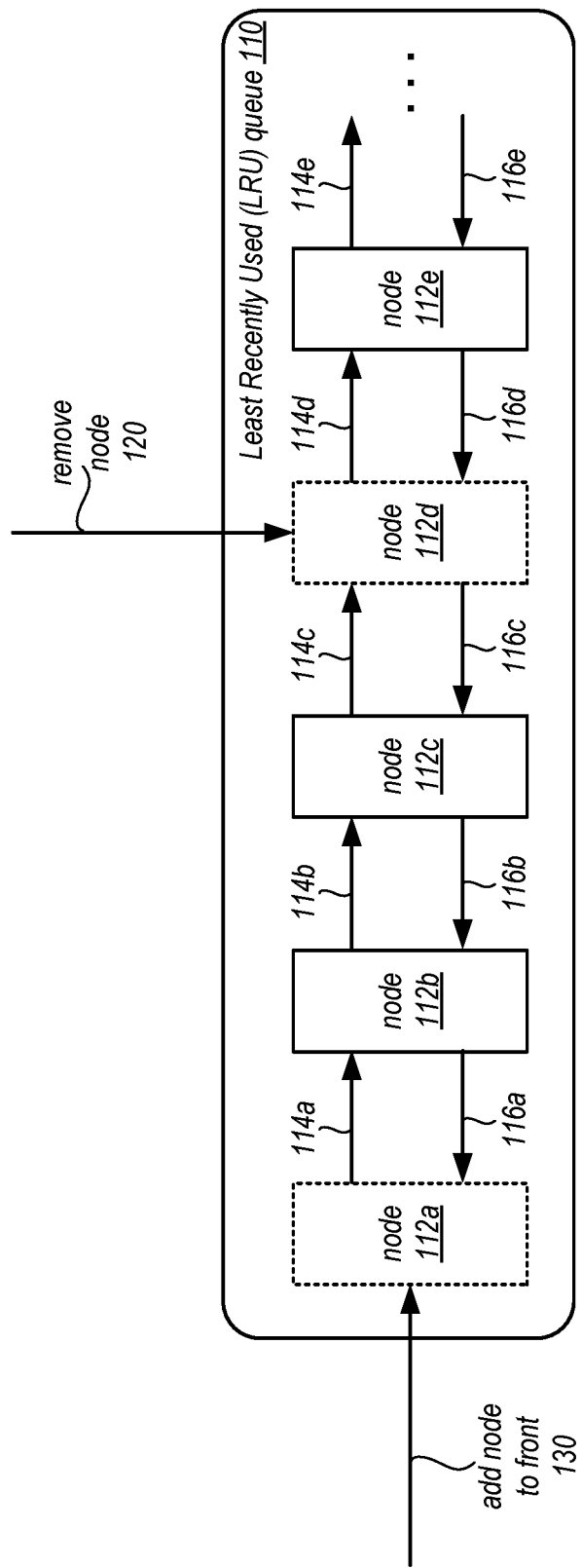
FIG. 1 is a logical block diagram illustrating concurrent remove and add-to-front operations on a Least Recently Used (LRU) queue, according to some embodiments.
Figure 2:
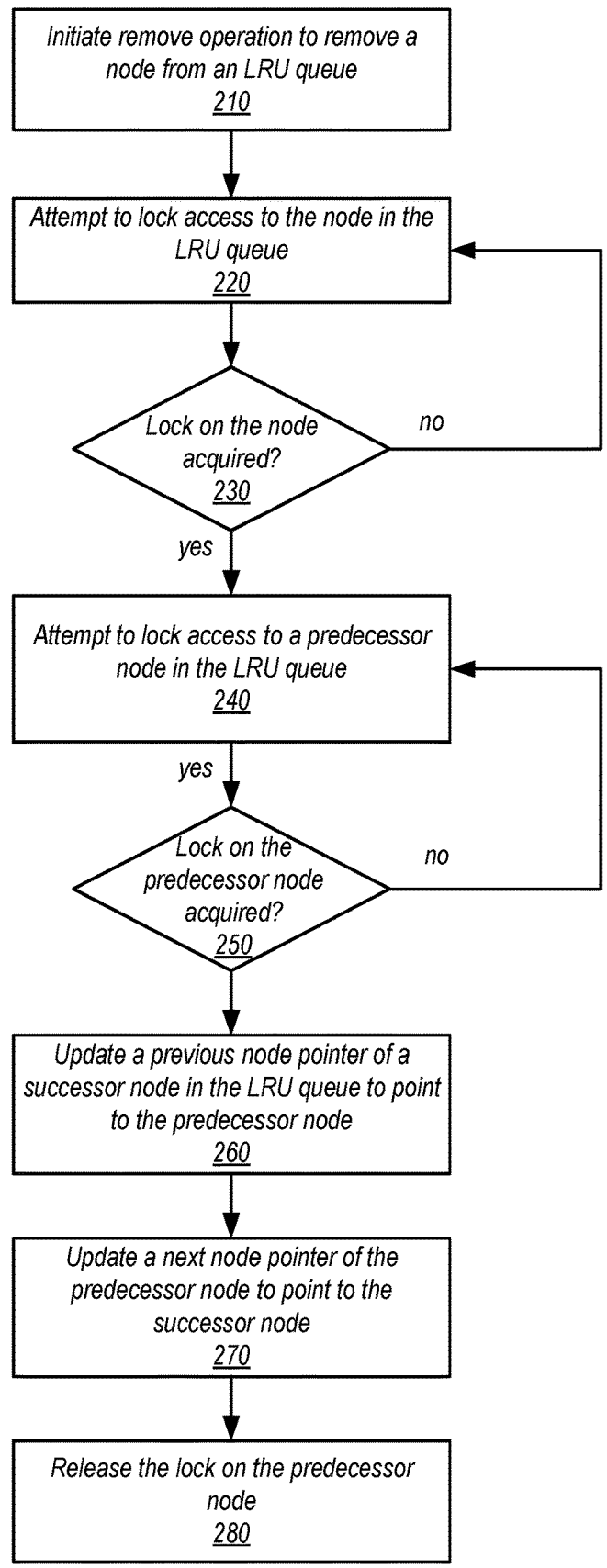
FIG. 2 is a high-level flowchart illustrating a remove operation for an LRU queue that may be performed concurrently with an add-to-front operation, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Techniques for supporting concurrent remove operations and add-to-front operations on a least recently used (LRU) queue are described herein in various embodiments. The add-to-front operation and remove operation are often the most frequent operations used on an LRU queue. Techniques that allow the add-to-front operation and remove operation to run concurrently with each other while no other operations are running can significantly enhance the performance of systems that implement LRU queues to perform various functions or operations. For example, in some embodiments, an LRU queue may be implemented for memory pages used in an operating system, such as Linux, as discussed below with regard to FIG. 9. In the kernel of the operating system, each of set of queues may be protected by a respective spin lock, which may be one of the most contended locks in the kernel. By implementing read-write locks instead of spin locks for performing removal operations and add-to-front operations on the LRU queues in the kernel, contention for the locks on the LRU queues may be significantly reduced (if not eliminated on some workloads), in various embodiments. In some embodiments, concurrent execution of these two operations from the execution of others can be easily achieved using a construct such as a read-write lock, where these frequent operations acquires the lock in shared (read) mode, and others in exclusive (write) mode.

Although add-to-front operations may naturally execute sequentially one after the other (where each add-to-front operation adds an element at the front of the LRU queue), supporting concurrent remove operations and add-to-front operations on a LRU queue can provide a high level of concurrency, in various embodiments. Allowing remove operations to keep running concurrently while add-to-front operations are also performed can prevent scenarios where add-to-front operations that would otherwise exclusively access the LRU queue, limit the time period in which remove operations could run in parallel (as the LRU queue would not be able to stay in shared mode access for a long time due to the high frequency of the add-to-front operations).

In some embodiments, support for concurrent performance of other operations (in addition to remove operations and add-to-front operations) may be implemented using similar techniques to those described herein.

FIG. 1 is a logical block diagram illustrating concurrent remove and add-to-front operations on a Least Recently Used (LRU) queue, according to some embodiments. In at least some embodiments, the LRU queue described herein is implemented as a doubly linked list. For example, FIG. 1, LRU queue 110 includes various nodes, such as nodes 112a, 112b, 112c, 112d, 112e, and so on. Nodes 112 may include any type of data element, object, or portion thereof, which may be stored in LRU queue 110 in order to perform various operations, such as providing a buffer or storage of operations to be performed or pages (or other storage structures), among other examples, in some embodiments. Nodes 112 may include pointers to adjacent successor nodes in LRU queue 110, such as links 114a, 114b, 114c, 114d, and 114e. Nodes 112 may also include pointers to adjacent previous nodes in LRU queue 110, such as pointers 116a, 116b, 116c, 116d, and 116e.

In various embodiments, a remove operation may accept a pointer to a node in LRU queue 110, and may remove the node identified by the pointer from the LRU queue 110 while maintaining a correct list structure, in some embodiments. For example, an operation to remove node 120 may be invoked to remove node 112d from LRU queue 110. Pointers of the previous node (node 112c) and successor node (112e) may be updated to become adjacent (e.g., where pointer 114c would point to node 112e directly and pointer 116d would point to node 112c directly). In this way, node 112d would no longer be included in any evaluation of LRU queue 110 performed by traversing the pointers 114 and 116. After a node is removed, the memory of the removed node can be used by the caller of the remove operation in an arbitrary manner, in some embodiments. In some embodiments, a remove operation extracts the first node 112 in the queue (e.g., node 112a).

In various embodiments, an add-to-front operation may accept a pointer to a node to add to LRU queue 110, and may add the node to LRU queue while maintaining a correct list structure, in some embodiments. For example, an operation 130 to add a node to the front of queue 110 may be invoked to add node 112a to LRU queue 110. Pointers of the added node 112a and the successor node, node 112b, may be updated to become adjacent (e.g., where successor node pointer 114a of node 112a points directly to node 112b and where previous node pointer 116a of node 112b points directly to node 112a). In this way, node 112a will be included in any evaluation of LRU queue 110 performed by traversing the pointers 114 and 116.

In some embodiments, the remove operation 120 and the add-to-front operation 130 can run in parallel with each other. For example, as discussed in the techniques below with regard to FIGS. 2-8, an attempt to remove node 112d would not lock any of the nodes that would be locked to add node 112a to LRU queue 110 (e.g., node 112b).

Various embodiments of the remove operation may be implemented that are commensurate with concurrently performing add-to-front operations. One embodiment of the remove operation may be described as follows and with regard to FIG. 2. In the example techniques discussed below with regard to FIG. 2, the memory used for the doubly linked list may be assumed to be used only for that purpose; thus, after a node is removed from the queue, the memory used by the fields that linked its node to the list, known as the previous (or "prev") and next fields, may only be used as pointers to LRU queue nodes.

As indicated at 210, a remove operation to remove a node from an LRU queue may be initiated, in some embodiments. An attempt to lock access to the node in the LRU queue may be made, as indicated at 220, in some embodiments. If the lock is not successfully acquired, then as indicated by the negative exit from 230, a retry attempt to lock access to the node may be performed (e.g., after some period of time), in some embodiments. If the lock on the node is acquired, as indicated by the positive exit from 230, then an attempt to lock access to a predecessor node (e.g., immediately prior to the node) in the LRU queue may be made, as indicated at 240, in some embodiments. If the lock is not successfully acquired, then as indicated by the negative exit from 250, a retry attempt to lock access to the predecessor node may be performed (e.g., after some period of time), in some embodiments.

If the lock on the node is acquired, as indicated by the positive exit from 250, then a previous node pointer (e.g., a "prev" field) of a successor node (e.g., immediately after the node) may be updated to point to the prior node, in some embodiments, as indicated at 260. As indicated at 270, a next node pointer (e.g., a next field) of the predecessor node may be updated to point to the successor node, in some embodiments. As indicated at 280, the lock on the predecessor node may then be released, in some embodiments.

In view of the elements above, an example scenario may be described. For example, in FIG. 4A, a given a doubly linked list may contain the following sequence of elements, node 410, node 420, and node 420. A remove operation can be performed for node 420. According to element 220 in FIG. 2, an attempt to lock node 420 (the node to be removed) may be made. When the lock 428 is successful, an attempt to lock the immediately prior node 410 may be made, as indicated at 240 in FIG. 2. Once both nodes 420 and 430 are locked, the operation unlinks and thus removes node 420 by updating the previous pointer 432 of node 430 to point to node 410, and the next pointer 414 of node 410 to point to node 430, and releasing the lock on node 410 (as indicated at elements 260, 270, and 280).

By holding the lock on both the node to be removed (e.g., node 420) and its predecessor (e.g., node 410) prior to updating the pointers of the node's neighbors (e.g., node 410 and node 430) in order to unlink and thus remove the node, a race on updating the pointers may be prevented, in some embodiments. The race may be prevented because neither neighboring nodes may be removed at the same time due to the remove operation gaining both locks in order to proceed. For example, this property can be maintained even though the successor of the node to be removed 430, is not locked by the operation that unlinks and removes 420, because an operation that removes node 430 would have to hold the lock of node 430 as well as of its predecessor node 420, (which would be blocked by the lock on node 420). Thus, node 430 cannot be removed while node 420 is being removed, in such a scenario. Similarly, because removing node 420 holds the lock of node 410, an attempt to remove node 410 would fail because the remove operation for node 420 would already hold a lock on node 410, preventing a remove operation for node 410 while the remove operation for node 420 occurs.

In some embodiments, a node may be locked by using a compare-and-swap (CAS) operation on its next field, which contains a pointer to its successor node, replacing it with NULL. In the above example, the operation to remove node 420, Remove(node 420), tries to lock 428 node 420 by applying a CAS to its next pointer 424. The locking might fail if its next pointer is already NULL, because, for example, an operation to remove node 430 may already be taking place, and is thus holding the lock on node 420. In that case, the operation to remove node 420 would wait until node 420's next pointer is updated to point to its new successor, and retry. Once node 420 is locked 428 the operation may try to lock 418 node 410 by using a CAS to change node 410's next pointer 414 field from a pointer to node 420 to a NULL. If the CAS fails, it may indicate that an operation to remove node 410 is taking place (although in this case, node 410 might not yet hold the lock on its predecessor, so it might be waiting itself for a removal of its predecessor, etc.). In this case of failure to lock node 410, the remove operation for node 420 may wait for the removal of node 410 to complete, so it keeps reading node 420's previous pointer 422 to obtain a pointer to its predecessor, and tries to lock it by modifying the predecessor's next field from node 420 to NULL.

Figure 4A:
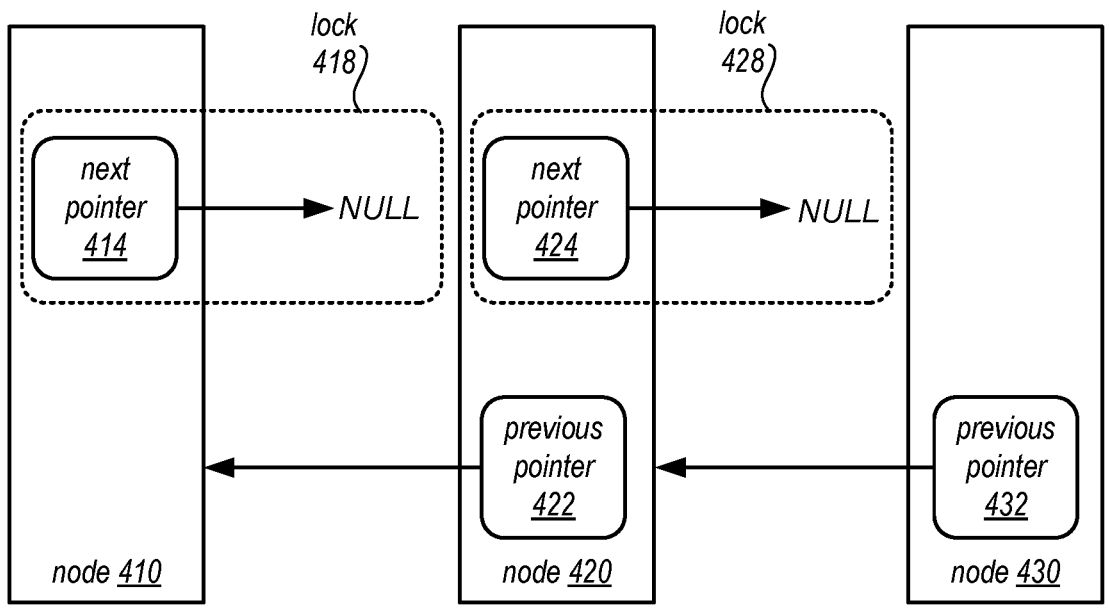
FIGS. 4A and 4B are logical block diagrams that illustrate locking scenarios for remove operations from an LRU queue, according to some embodiments.

Once successful, as illustrated in FIG. 4A, the operation may proceed to perform the updates to remove node 420, in some embodiments. The previous pointer 432 field of node 430, may be modified to point to node 410 (not illustrated) and then the next field of node 410 may be modified to point to node 430 (not illustrated), which unlocks node 410 and links it to node 430 with a single store operation, in some embodiments. The order of these two stores, updating the previous field 414 of node 430 and then the next pointer 414 field of node 410, may be strictly enforced, in some embodiments, because the update to node 410 also unlocks it, and doing it before node 430 is linked to it would violate the structure of the LRU queue while no locks are being held, which could lead to an incorrect behavior if concurrent operations on adjacent nodes take place.

In at least some embodiments, the above technique (as well as the pseudo code described below) may assume that a node always has a successor and a predecessor, which can be a valid assumption as long as there is a dummy node (that is never removed) that is used as the head and tail anchor points, as discussed below with regard to FIGS. 5 and 6.

Below is an example embodiment of pseudo code that may be implemented to perform the techniques discussed above with regard to FIG. 2:

```
void remove_node(Node *N) {
Node *successor_p = N->next;
while (successor_p == NULL || !CAS(&N->next, successor_p, NULL))
{
/* successor node is being removed, wait for it to finish */
successor_p = N->next;
}
/** Detection of whether the predecessor node is locked can be
 * performed by checking whether its next pointer points to the node
 * to be removed. Keep re-reading the next pointer of N.prev even
 * while N.prev does not change, because it might be the case that the
 * operation that removed a predecessor of N has already updated N's
 * prev pointer to point to its new predecessor, but has not yet
 * released the lock on N's new predecessor by updating its next
 * pointer. Thus, the prev value that might be read may already point
 * to the new predecessor, so a re-read of the next field of the node
 * it points to may be performed in order to determine if the next
 * field changes from NULL to a pointer to N.
 */
Node *predecessor_p = N->prev;
```

-continued

```
while (predecessor_p->next != &N || !CAS(&predecessor_p->next, N, NULL)) {
/**
 * Predecessor node is being removed; wait till a new unlocked
 * predecessor node
 */
predecessor_p = N->prev;
}
/** Note the update the to the successor prev pointer is performed
 * before updating the predecessor next pointer because updating the
 * next pointer of the predecessor node also unlocks it, which
 * allows it to be removed before its new successor points to it.
 */
successor_p->prev = predecessor_p;
predecessor_p->next = successor_p;
}
```

The techniques discussed above with regard to FIG. 2 and the pseudo code offer many benefits to the performance of operations on an LRU queue. For example, no additional memory overhead may be needed to perform the remove operation as the remove operation does not use any additional memory of fields to be added to the queue nodes, nor any additional memory to be allocated for the queue, in some embodiments. Another beneficial property of the remove operation is that the remove operation only operates on the next and prev pointers of the adjacent nodes of the node to be removed, which may also be embedded in any other structure, in some embodiments. In use cases such as an LRU queue in an operating system kernel, where the elements in the queue are memory pages that contain the prev and next pointers. Adding any external memory per page or additional fields to it would add significant memory overhead because per-page data already accounts for a significant percentage (e.g., 1.5%) of total memory usage on common architectures. Moreover, adding external memory or additional fields could complicate the system and/or affect the implementation of other operations, in some embodiments.

Another property of the above remove operation relates to cache locality, as the remove operation only accesses the prev and next fields of its adjacent nodes, the cache footprint of the remove operation may be very low. Another beneficial property of the remove operation may be to provide fine grained parallelism where two remove operations only block each other if they are operating on two adjacent nodes in the LRU queue. Moreover, the above remove operation can still be used in conjunction with the simple, sequential variants of the remove and add-to-front operations. No changes to these variants of the remove and add-to-front operations would be necessary, allowing them to run with no additional overhead when there is no or low contention in the system, and only use the above remove operation when contention for an LRU occurs.

In some scenarios, arbitrary usage of the memory being used by an LRU queue's nodes could occur while other remove and add-to-front operations are performing, which could adversely affect the performance of these operations. For example, consider the group of nodes illustrated in FIG. 4B, if a remove operation for node 450 begins, and acquires the lock on both node 450 and node 440, and pauses. Concurrently, a remove operation for node 460 may begin and successfully lock node 460 and then reads previous pointer 462 of node 460 that still points to node 450, and pauses (indicating that the remove operation for node 460 cannot acquire the lock to node 450). The remove operation for node 450 may complete after updating previous pointer 462 of node 460 and next pointer 444 of node 440 to unlink node 450. After the remove operation for node 450 completes, the memory used by node 450 is reclaimed, and the memory that is used to hold the next pointer 454 is assigned a value that is equal to the address of node 460. The remove operation for node 460 continues, after it already read its previous pointer 462 value as node 450, but before attempting the CAS to change node 450's next pointer 454 from node 460 to a NULL. Because the memory of node 450 now contains a value equal to the address of node 460, the CAS may succeed, even though the memory to which it is applied is no longer the predecessor of node 460 (e.g., making node 450 appear to still be present to the remove operation for node 460 though it has actually been removed).

If the memory is restricted to only being used in LRU queues, this problematic CAS scenario may not take place, because the node that was removed, node 450, cannot become node 460's predecessor again before node 460 finishes its removal (because the only concurrent operations that are allowed are add-to-front that may not add a node to the front of the list if the older front node is locked). However, once the memory of node 450 is reclaimed, without any restrictions on the values that may be written in the location where node 450's next pointer 454 field used to reside, any value can be stored there, including a pointer to node 460, which would otherwise enable the above scenario.

Figure 3:
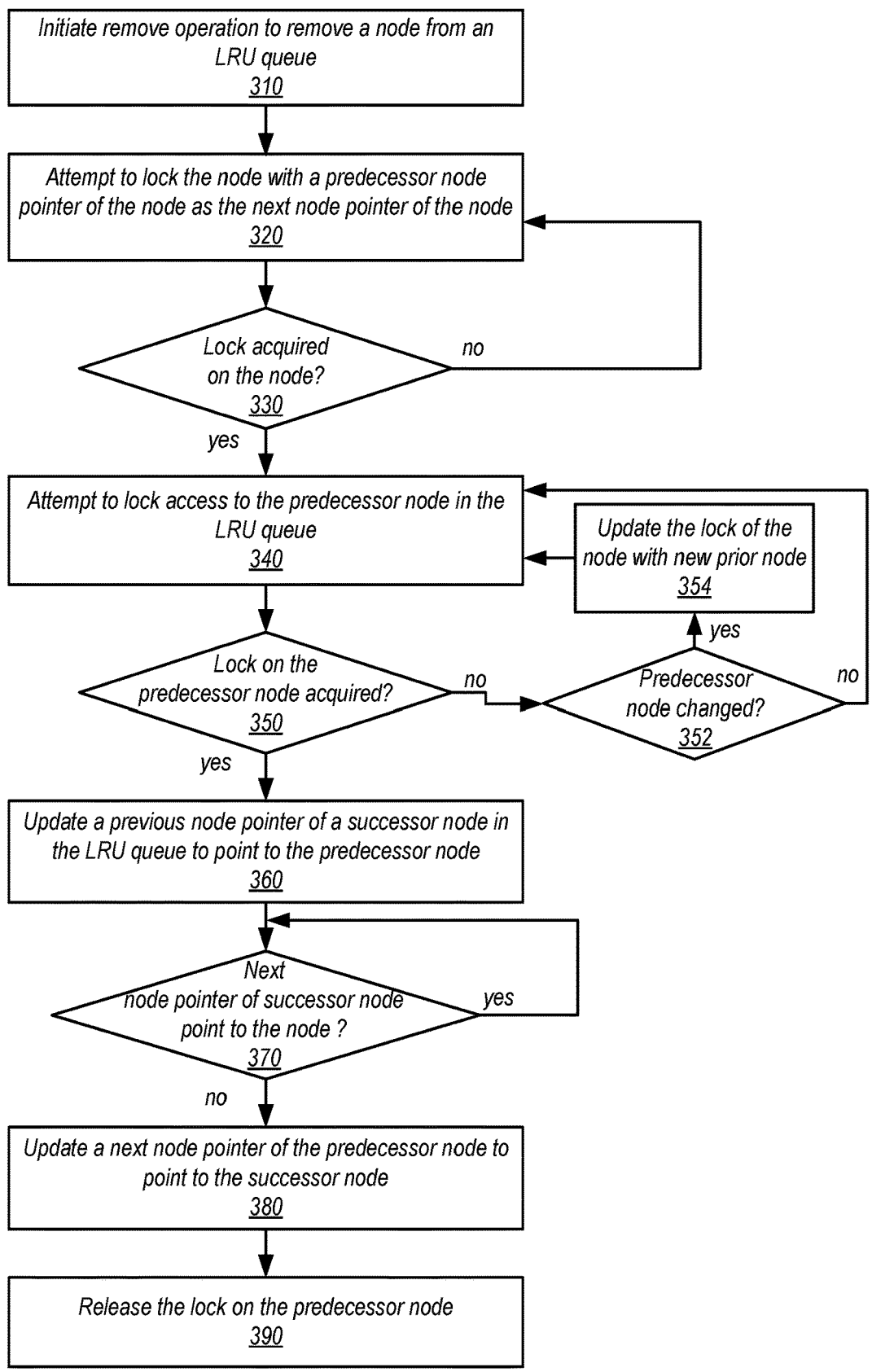
FIG. 3 is a high-level flowchart illustrating a remove operation that tolerates arbitrary usage of memory of a node, according to some embodiments.

In some embodiments, modifications to the remove operation can be made to address this scenario in order to tolerate arbitrary usage of the node's memory during the execution of remove operations. FIG. 3 is a high-level flowchart illustrating a remove operation that tolerates arbitrary usage of memory of a node, according to some embodiments. In some embodiments, a publishing technique may be applied so that, for instance, a thread can reference a given structure in memory in order to prevent another thread from reclaiming it during the time of reference. Because nodes may only need to be protected during the execution of remove and add-to-front operations addressing the above scenario may only introduce a few additional loads and stores to tolerate the arbitrary usage of the nodes' memory, in some embodiments.

As indicated at 310, a remove operation to remove a node from an LRU queue may be initiated, in some embodiments. An attempt to lock the node with a predecessor node pointer of the node as the next node pointer of the node may be made, as indicated at 320, in some embodiments. If the lock is not successfully acquired on the node, as indicated by the negative exit from 330, then the technique may try again to acquire the lock (e.g., after a wait period).

If the lock is acquired, as indicated by the positive exit from 330, then an attempt to lock access to the predecessor node in the LRU queue may be made, as indicated at 340. If the lock is not acquired on the predecessor node, then the technique may try again to acquire the lock (e.g., after a wait period). As indicated at 352, when an attempt to acquire a lock on the predecessor node has failed, a determination may be made as to whether the predecessor node of the node being removed has changed, in some embodiments. For example, the previous node pointer of the node being removed may be read again. If the value of the previous node pointer is different (from a previous reading, then the predecessor node may be determined to be changed. As indicated at 354, the lock of the node may be updated with the new prior node before reattempting to lock the predecessor node (which be an attempt to lock the new predecessor node), in some embodiments.

If the lock on the predecessor node is acquired, as indicated at 360, then a previous node pointer of a successor node may be updated in the LRU queue to point to the predecessor node, in some embodiments. A determination may then be performed as to whether a next node pointer of the successor node points to the node, as indicated at 370. If the next node pointer of the successor node does point to the node, then a remove operation on the successor node may have been initiated and then the technique may try again to proceed once the next node pointer of the success node does not point to the node. As indicated at 380, a next node pointer of the predecessor node may then be updated to point to the successor node and the lock on the predecessor node may be released, as indicated at 390.

Figure 4B:
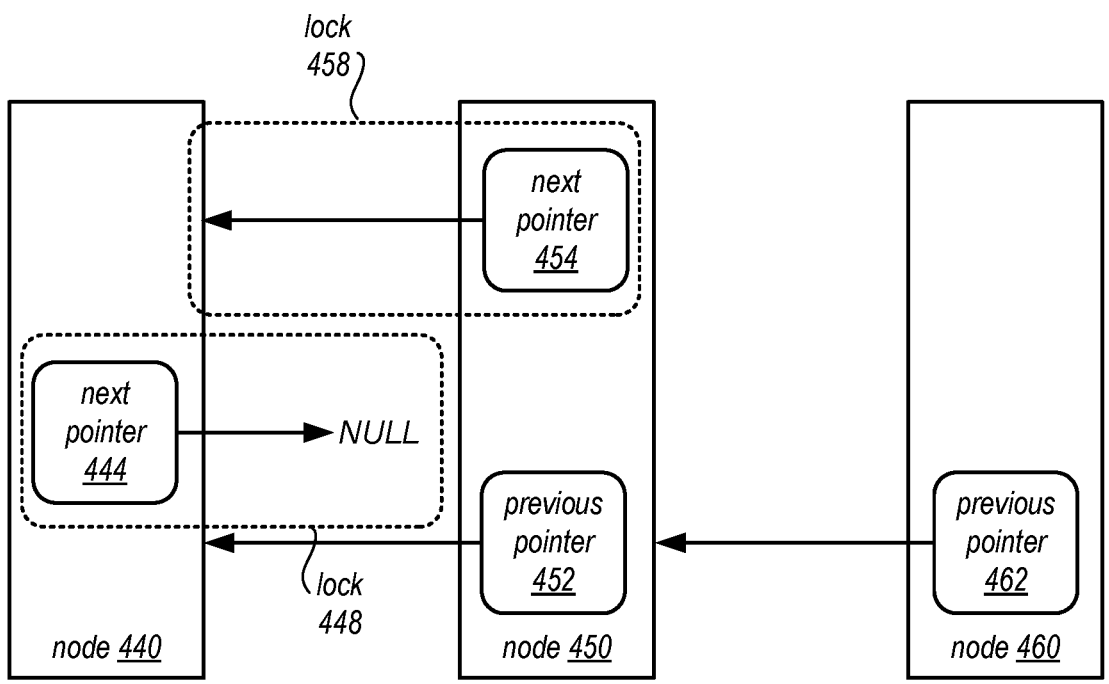

FIG. 4B illustrates an example locking scenario in accordance with the technique discussed above. In some embodiments, a CAS operation to lock a node to be removed may use the value of the pointer to the predecessor node (e.g., using previous pointer 452 value as the value to store in next pointer 454 when performing the CAS. In this way, a remove operation of node 450's predecessor (node 440) to detect that a remove operation for node 450 is referencing it. The remove operation for node 450 may keep updating its next pointer 454 to point to its predecessor whenever its predecessor node changes (e.g., if node 440 is removed before the remove operation of node 450 completes). For example, in some embodiments, a remove operation for node 440 may check if node 450 is locked using a pointer to the node it is removing node 440, after updating a previous pointer 450 of node 440 to point to a new predecessor node that is a predecessor to node 440 (not illustrated) but before releasing the lock on that node (to prevent node 420 from being removed while a remove operation for node 440 is looking at node 450), in some embodiments. If indeed it finds that the remove operation for 440 is locked 458 using a pointer 454 to node 440, the remove operation of node 440 may wait until reading a new predecessor, and update its next pointer 454 to point to that new predecessor node. At that point a remove operation for node 440 can determine that the node is no longer being inspected by a successor's remove operation, and can safely unlink node 440, and reclaim its memory, in some embodiments. The lock 448 for node 440 acquired to remove node 450 (at element 350 above) may store a null value in next pointer 444, similar to the technique discussed above with regard to FIG. 4A).

The following pseudo code illustrates example modifications to be made to the above remove operation in order to tolerate arbitrary usage of reclaimed memory as discussed above with regard to FIGS. 3 and 4B:

```
void remove_node(Node *N) {
Node *successor_p = N->next;
Node *predecessor_p = N->prev;
while (successor_p == NULL | | !CAS(&N->next, successor_p, predecessor_p)) {
/* successor node is being removed, wait for it to finish */
successor_p = N->next;
predecessor_p = N->prev;
}
/**
* Reread N-> prev to make sure the right value is published (the node
* about to be accessed).
*/
tmp = N->prev;
while (predecessor_p != tmp) {
N->next = tmp; /* No CAS may be needed, as the lock is held on N */
predecessor_p = tmp;
tmp = N-prev;
```

-continued

```
};
/** Detection of whether the predecessor node is locked can be
 * performed by checking whether its next pointer points to the node
 * to be removed. Keep re-reading the next pointer of N.prev even
 * while N.prev does not change, because it might be the case that the
 * operation that removed a predecessor of N has already updated N's
 * prev pointer to point to its new predecessor, but has not yet
 * released the lock on N's new predecessor by updating its next
 * pointer. Thus, the prev value that might be read may already point
 * to the new predecessor, so a re-read of the next field of the node
 * it points to may be performed in order to determine if the next
 * field changes from NULL to a pointer to N.
 * If the prev pointer does change, update the lock (N->next) to
 * reflect the new predecessor.
 */
Node *predecessor_p = N->prev;
while (predecessor_p->next != &N || !CAS(&predecessor_p->next, N, NULL)) {
/**
 * Predecessor node is being removed; wait till a new unlocked
 * predecessor node, update the value used to lock N if N's
 * predecessor has changed.
 */
tmp = N->prev;
if (tmp != predecessor_p) {
  N->next = tmp;
  predecessor_p = tmp;
}
}
/** Before updating N->prev->next to point to N->next, check that
 * N->succ->next does not point to N - that is the successor is not
 * locked using a pointer to the node being removed, which indicates
 * that it might be accessing N's memory. If so, wait until N->next
 * re-reads its prev pointer, and updates its lock value (N->next) to
 * reflect its new predecessor, after which point it will not access
 * N/s memory anymore. Then, unlink N by updating its predecessor's
 * next pointer.
 *
 * Note the update the to the successor prev pointer is performed
 * before updating the predecessor next pointer because updating the
 * next pointer of the predecessor node also unlocks it, which
 * allows it to be removed before its new successor points to it.
 */
successor_p->prev = predecessor_p;
/**Is the successor locked? If so, which value? If it is &N, wait until
 *it isn't
 */
while (successor_p-> == &N);
predecessor_p->next = successor_p;
}
```

By implementing features similar to those discussed above, the remove operation may be extended to tolerate arbitrary usage of the memory used by the LRU queue's nodes, even while other remove and add-to-front operations are still running, in some embodiments. Such features may provide a beneficial property in scenarios, such as LRU queues implemented as part of a kernel for example, as the memory used for the prey and next pointers may be part of the queued page, and may only be used temporarily for this purpose while the page is in the queue. Once the page is no longer queued, this memory can be used for any other purpose, so no assumptions could be made on the content of these fields once the remove operations returns in this example.

Additionally, the above modifications to the remove operation may prevent unnecessary blocking between the operation accessing shared memory (e.g., causing a remove operation to wait for all other remove operations that were executing concurrently with it, regardless of which nodes they operated on), or prevent the need to use significant overhead for most or all operations that are running concurrently, in order to coordinate with each other on accessing shared memory that might be reclaimed.

In some embodiments, the benefits of restricting parallelism on the LRU queue to remove operations and add-to-front operations as described herein may provide the following properties (in light of the modifications to the remove operation discussed above). For example, no additional memory may be needed for handling concurrent memory reclamation, as only the next and previous pointers are used for that purpose. Furthermore, additional overhead for the common case execution introduces only a few loads and stores. The modifications may also not introduce additional atomic synchronization primitives such as compare and swap, keeping the additional feature of supporting concurrent memory reclamation inexpensive. No change to the granularity of the parallelism may be provided by the unmodified remove operation (e.g., as no remove operation waits for another unless the two removals are for adjacent nodes and one of the remove operations still references the memory of its neighboring node). Additionally, the modifications to the remove operation may still be compatible with the add-to-front technique discussed below.

Figure 5:
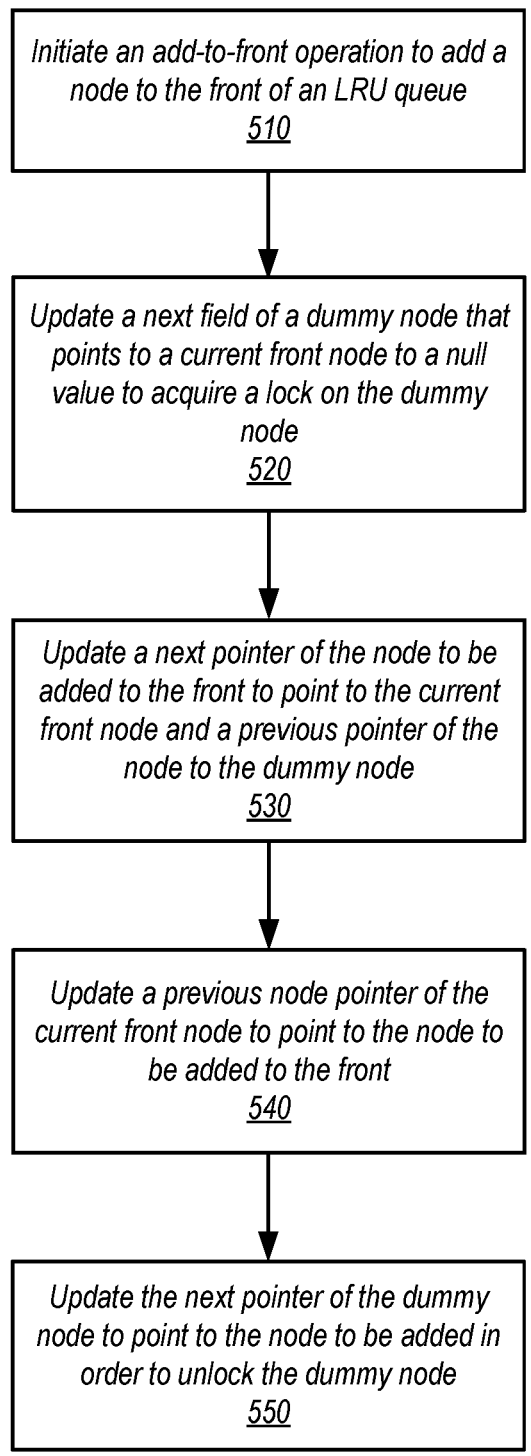
FIG. 5 is a high-level flowchart illustrating an add-to-front operation for an LRU queue that may be performed concurrently with a remove operation, according to some embodiments.
Figure 6:
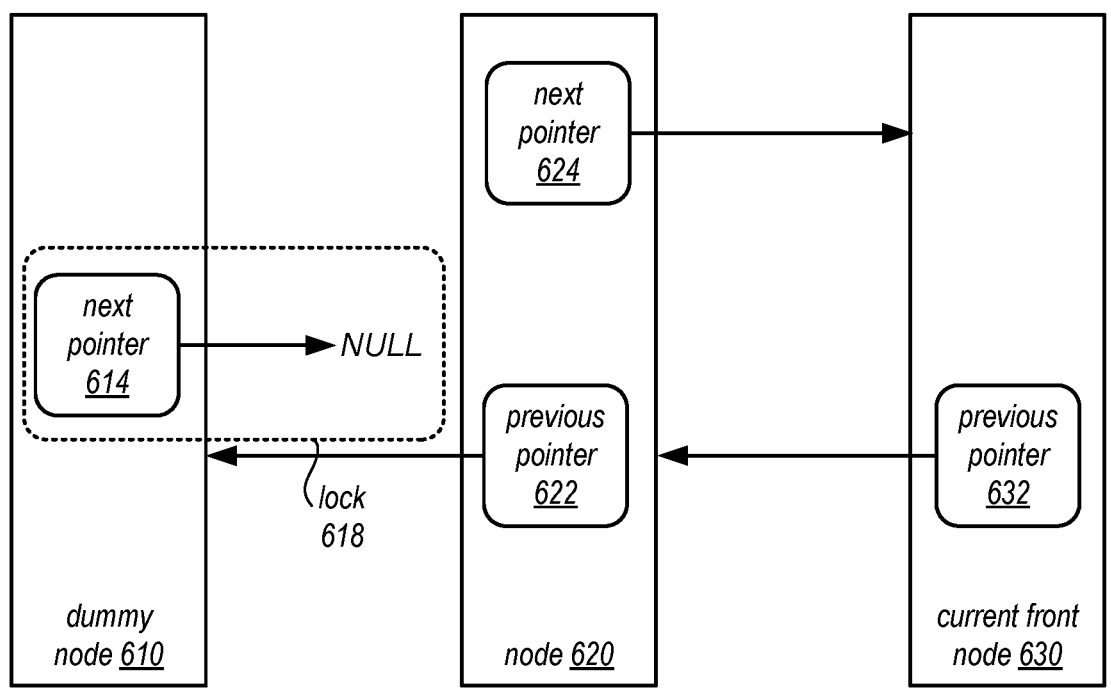
FIG. 6 is a logical block diagram that illustrates a locking scenarios for an add-to-front operation for an LRU queue, according to some embodiments.

FIG. 5 is a high-level flowchart illustrating an add-to-front operation for an LRU queue that may be performed concurrently with a remove operation, according to some embodiments. In various embodiments, the add-to-front operation may rely upon a dummy node to store a pointer to the front node of an LRU queue (allowing the dummy node to serve as a predecessor of the front node). In this way, as long as the dummy node is locked, the current front node cannot be removed, because the lock is held on its predecessor. Additionally, no other add-to-front operation may add a node to the front of the list, because a lock is held on the dummy node, whose next pointer is updated in order to insert a new front node to the list as discussed below, in some embodiments.

As indicated at 510, an add-to-front operation to add a node to the front of an LRU queue may be initiated, in some embodiments. For example, as illustrated in FIG. 6, an add-to-front operation to add node 620 to an LRU queue that includes current front node 630 and dummy node 610. As indicated at 520, a next field of a dummy node that points to a current front node may be updated to a null value in order to acquire a lock on the dummy node, in some embodiments. For example, as illustrated in FIG. 6, a next pointer 614 may be changed to point to null in order to implement lock 618 on dummy node 610 (e.g., using a compare and swap operation as discussed in the pseudo code below), in some embodiments. In some embodiments, if the LRU queue is empty, then the dummy node's next pointer may point to itself). As indicated at 530, a next pointer of the node to be added to the front may be updated to point to the current front node and a previous pointer of the node to be added may be updated to point to the dummy node, in some embodiments. For example, next pointer 624 of node 620 may be updated to point to current front node 630 and previous pointer 622 may be updated to point to dummy node 610. At this point, the current front node can be removed by a remove operation according to the various techniques discussed above, in some embodiment, because the new front node could not be removed (because of the lock on the dummy node), and its next pointer may no longer need to be modified by the add-to-front operation (as it was already set to point to the old front node).

As indicated at 540, update a previous node pointer of the current front node to point to the node to be added to the front, in some embodiments. For example, previous pointer 632 may be updated to point to node 620 as illustrated in FIG. 6. As indicated at 550, update the next pointer of the dummy node to point to the node to be added in order to unlock the dummy node, in some embodiments. For example, next pointer 614 may be updated to point to node 620 (not illustrated). Because the dummy node is not locked, a remove operation could remove the added front node (e.g., node 620).

The following pseudo code illustrates an example add-to-front operation according to the features discussed above:

```
void add_to_front(Node *N, Node* dummyNode)
{
    Node *oldFront;
    oldFront = dummyNode->next;
    while (oldFront == NULL | | !CAS(&dummyNode->next, oldFront,
       NULL)) {
        oldFront = dummyNode->next;
    }
    N->next = oldFront;
    N->prev = dummyNode;
    oldFront->prev = N;
    dummyNode->next = N;
}
```

Multiple LRU queues may be implemented for various purposes, in some embodiments. For example, caching techniques may include using two different LRU queues as an active list for frequently accessed pages (hot pages) and an inactive list for infrequently accessed pages (cold pages). Some concurrent operations for operating upon multiple LRUs may be implemented. For example, a move operation may be implemented that moves a node from a source LRU queue to a destination LRU queue may be implemented using both the remove and add-to-front operations according to the various techniques discussed above to implement a move operation that can be concurrently performed with other operations on the source or destination LRU queue (e.g., other add-to-front or remove operations). In scenarios implementing a move operation, multiple threads can operate on the same node, so the move operation implements safeguards to mark a node locked starting at the beginning of the move operation that is performed by the remove operation and lasting until it has been added to the front of the destination LRU, in some embodiments.

To implement a safe move operation, the move operation may exclude successive threads from also completing a CAS on the same node. Because a technique like the technique discussed above with regard to FIG. 3 places a predecessor node's address in the 'next' field of the target node to remove, an address may be indistinguishable from the original address that was in the next node field prior to the performance of the replacement of the original address in the next field. In various embodiments, one of the bits (e.g., a low order bit) of a node's 'next' field may be used to indicate that the node is being operated on. For example, such a bit may be free because the addresses contained in the next field may be at least 4-byte aligned. The lock bit may be set during the same locking operations used in the remove and add-to-front algorithms, in order to provide correctness and good performance, as the lock bit adds negligible overhead to the these operations. Other parts of the algorithms are modified to recognize and maintain the bit as needed.

Figure 7:
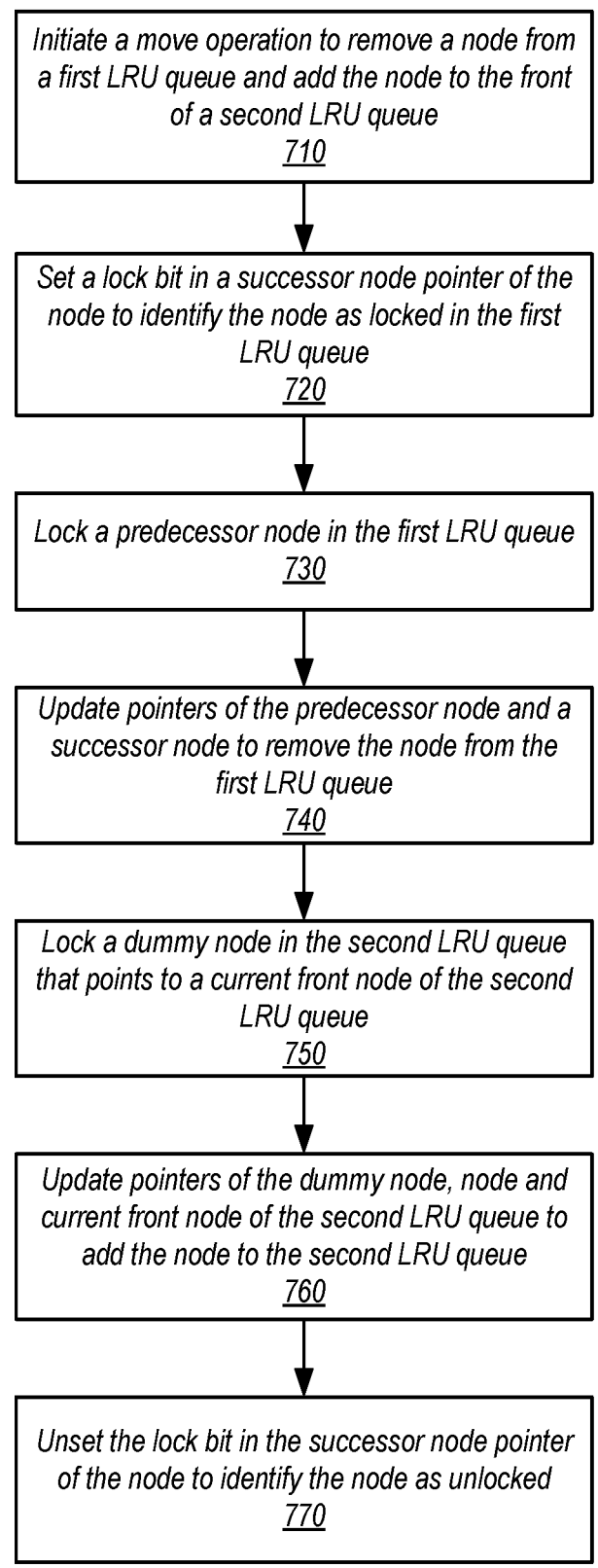
FIG. 7 is a high-level flowchart illustrating a move operation between LRU queues, according to some embodiments.
Figure 8A:
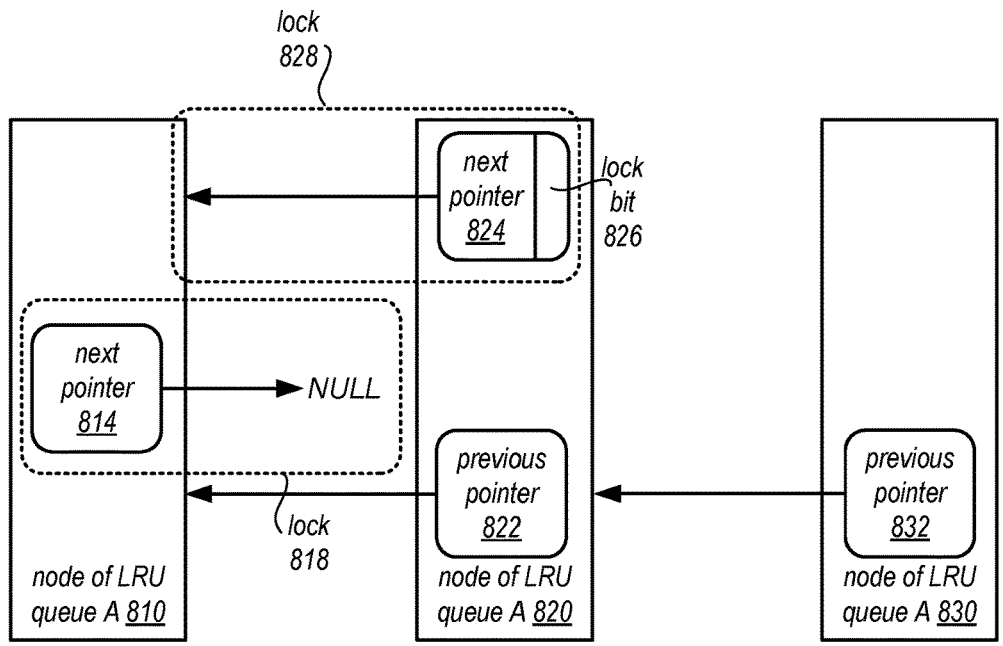
FIGS. 8A and 8B are logical block diagrams that illustrate locking scenarios for a move operation from an LRU queue, according to some embodiments.

FIG. 7 is a high-level flowchart illustrating a move operation between LRU queues, according to some embodiments. As indicated at 710, a move operation to remove a node from a first LRU queue and add the node the front of a second LRU queue may be initiated, in some embodiments. For instance, node of LRU queue A 830 in FIG. 8A may be the subject of a move operation to LRU queue B in FIG. 8B. The move operation may receive a pointer to the node to remove (and, in some embodiments, may also receive pointers for the source and destination LRU queues). As indicated at 720, a lock bit in a successor node pointer of the node may be set (e.g., written with a value of "1") to identify the node as locked in the first LRU queue. For example, a CAS to lock the node for a separate remove operation would write the correct value (e.g., NULL or the pointer to the predecessor node) correctly but for the set lock bit which would prevent the CAS operation from completing successfully. As illustrated in FIG. 8A, a lock 828 may be acquired when next pointer 824 of node 820 is set to point to node 810 and include a lock bit 826.

Figure 8B:
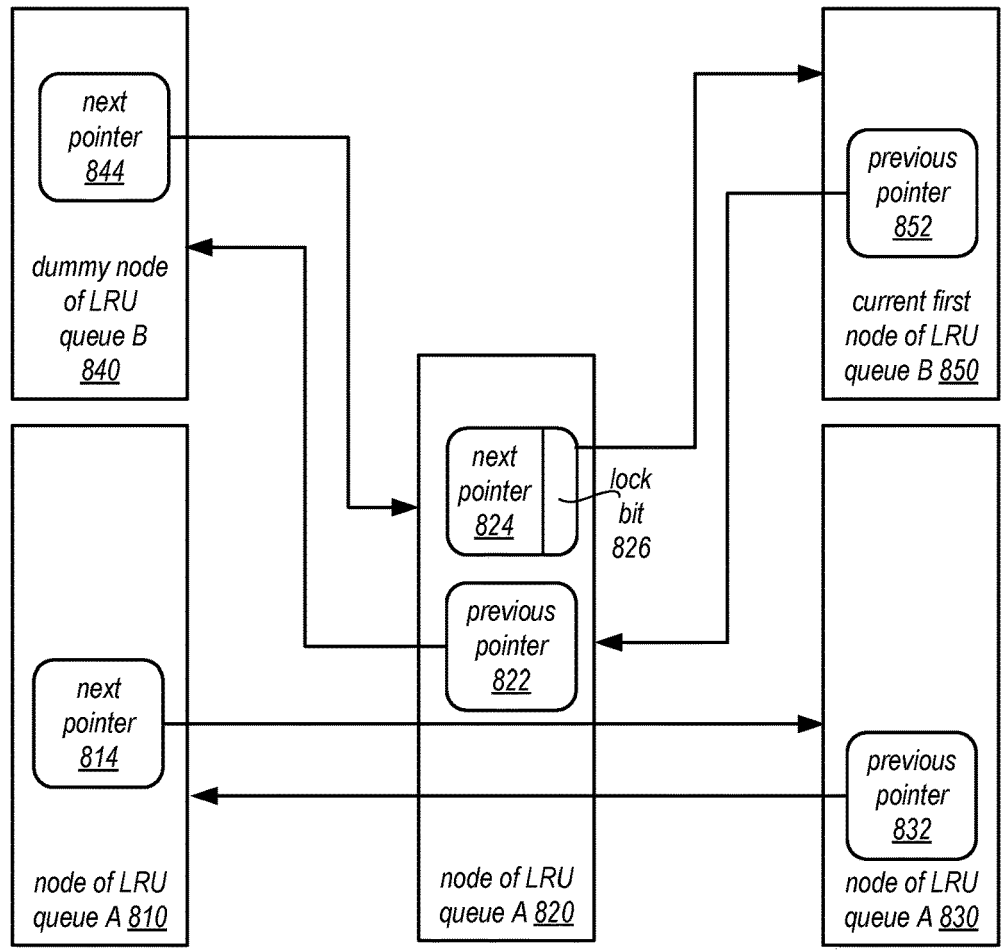

As indicated at 730, then a predecessor node of the node may be locked in the first LRU queue, in some embodiments. For example, a value of NULL may be written as the value of the next node pointer in the predecessor node, such as null value for next pointer 814 of node 810 of LRU queue A in FIG. 8A. As indicated at 740, pointers of the predecessor node and success node may be updated to remove the node from the first LRU queue, in some embodiments. As discussed above, the previous pointer of the success node may be updated before the next node pointer of the predecessor node, in some embodiments. For example, as illustrated in FIG. 8B, next pointer 814 of node 810 of LRU queue A points to node 830 of LRU queue A and previous pointer 832 of node 830 of LRU queue A points to node 810 of LRU queue A.

As indicated at 750, a dummy node in the second LRU queue that points to the current front node of the second LRU queue may be locked, in some embodiments. For example, as with the add-to-front operation discussed above, a NULL value may be stored as the next node pointer value in the dummy node (e.g., next pointer 844 of dummy node 840 of LRU queue B pointed to NULL (not illustrated)). As indicated at 760, pointers to the dummy node, node, and current front node of the second LRU queue may be updated to add the node to the second LRU queue, in some embodiments. For example, the updates discussed above with regard to elements 530, 540, and 550 may be performed for the node in the second LRU queue. As illustrated in FIG. 8B, previous pointer 852 of current first node 850 of LRU queue B may be updated to point to node 820, previous pointer 822 of node 820 may be updated to point to dummy node 840 of LRU queue B, next pointer 824 of node 820 may be updated to point to current first node 850 of LRU queue B, and next pointer 844 of dummy node 840 of LRU queue B may be updated to point to node 820 (which may unlock dummy node 810 but not node 820).

Because the lock bit remains set after the remove operation has finished (e.g., after element 740) and is maintained when the node is added to its new LRU queue (e.g., through element 760), a concurrent operation on either the first or second LRU queue cannot interfere with the move operation. Utilizing a lock bit in this way may allow for the lock bit to be unset without using an atomic operation like CAS. As illustrated in FIG. 8B, node 820 may be fully added to LRU queue B with the appropriate pointers updated at dummy node 840 of LRU queue B and current first node 850 of LRU queue B without being yet unlocked. As indicated at 770, the lock bit in the successor node pointer of the node may be unset to identify the node as unlocked, in some embodiments. For instance, the lock bit may be returned to "0" value. Thus, unlocking a moved node like node 820 may be decoupled from adding the node to the new LRU queue, in some embodiments.

Figure 9:
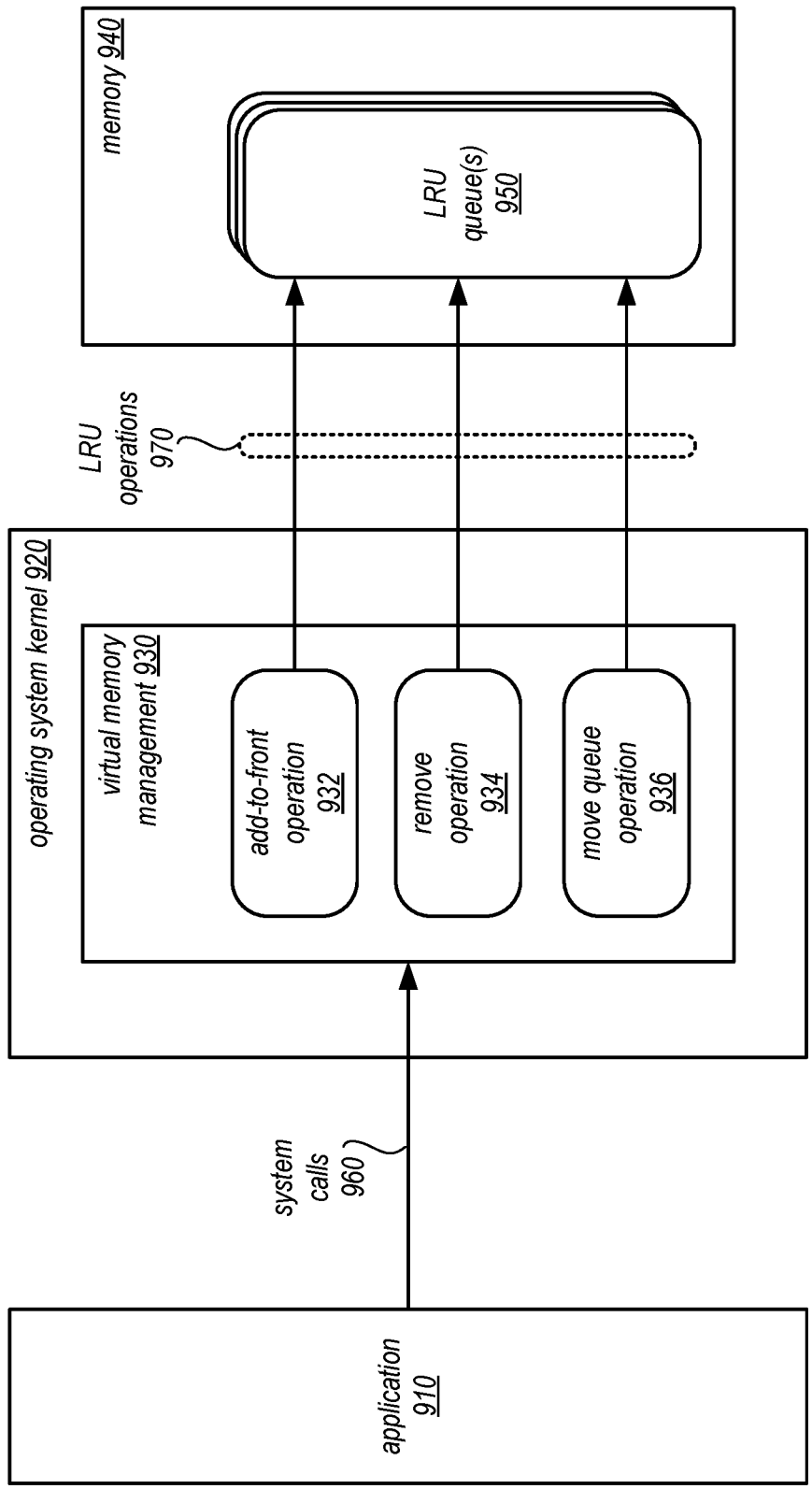
FIG. 9 illustrates an example of virtual memory management in a kernel of an operating system that implements concurrent remove and add-to-front operations for LRU queues, according to some embodiments.

Various different LRU queue implementations may utilize concurrent remove and add-to-front operations in order to support different tasks in different systems, as discussed above with regard to FIG. 1. FIG. 9 illustrates an example of virtual memory management in a kernel of an operating system that implements concurrent remove and add-to-front operations for LRU queues, according to some embodiments.

Virtual memory management 930 may be implemented as part of operating system kernel 920 in order to provide memory management features for different applications such as application 910. For example, an application may perform various system calls 960 to access data stored in memory 940 (or in other storage which may be retrieved, such as block-based storage).

Virtual memory management 930 may perform various operations to service those calls. As part of servicing system calls 960, virtual memory management may maintain one or more LRU queues 950 in memory 940 (which may be similar to memory 1010 in FIG. 10 discussed below). LRU queue(s) 950 may store data or metadata used by virtual memory manger to implement, among other features, a cache of data pages for application 910. When retrieving, caching, removing, or otherwise manipulating the cache of data pages, virtual memory management 930 may perform various operations discussed above with regard to FIGS. 1-8, including add-to-front operations 932, remove operations 934, and move queue operations 936. By implementing concurrent LRU operations 970, such as add-to-front operations 932, remove operations 934, and move queue operations 936, virtual memory management 930 may spend less time waiting on locks for different nodes in LRU queue(s) 950 to become free, increasing the performance of application 910.

Figure 10:
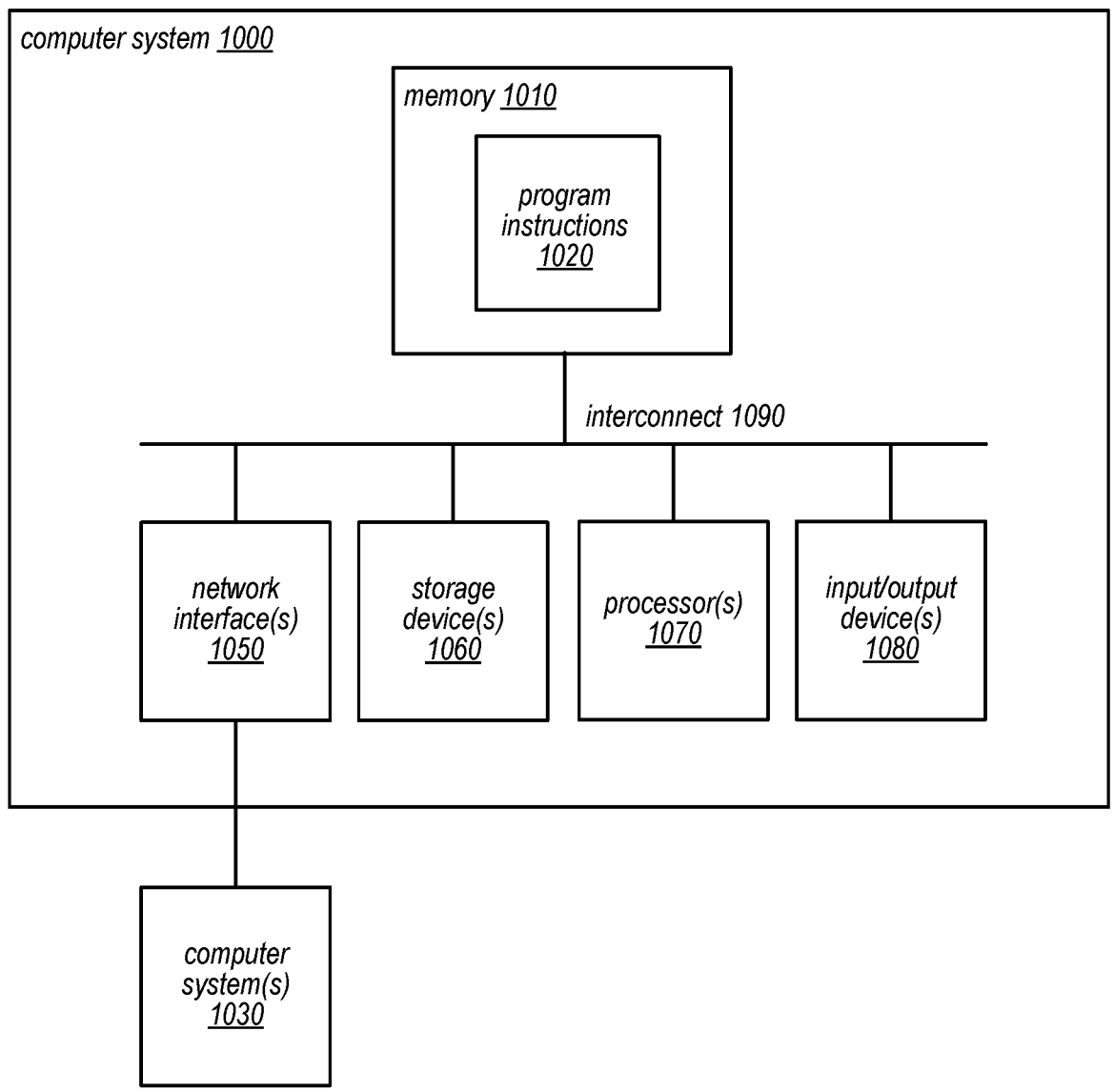
FIG. 10 illustrates an example computing system, according to some embodiments.

FIG. 10 illustrates a computing system configured to implement the methods described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for supporting concurrent remove operations and add-to-front operations on a least recently used (LRU) queue on a computing system, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. Each of the processors 1070 may include a hierarchy of caches, in various embodiments. The computer system 1000 may also include one or more persistent storage devices 1060 (e.g. optical storage, magnetic storage, hard drive, tape drive, solid state memory, etc) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement remove operations, add-to-front operations and move operations (which may be one or more of the various implementations discussed above with regard to FIGS. 1-9) in order to implement supporting concurrent remove operations and add-to-front operations on a least recently used (LRU) queue are described herein. Program instructions 1020 may be encoded in platform native binary, any interpreted language such as Java™ byte-code, or in any other language such as C/C++, Java™, etc or in any combination thereof. System memories 1010 may also contain LRU queue(s) 1026 upon which concurrent remove and add-to-front operations may be performed, in some embodiments.

In one embodiment, Interconnect 1090 may be configured to coordinate I/O traffic between processors 1070, storage devices 1070, and any peripheral devices in the device, including network interfaces 1050 or other peripheral interfaces, such as input/output devices 1080. In some embodiments, Interconnect 1090 may perform any necessary protocol, timing or other data transformations to convert data signals from one component (e.g., system memory 1010) into a format suitable for use by another component (e.g., processor 1070). In some embodiments, Interconnect 1090 may include support for devices attached through various types of peripheral buses, such as a variant of the Peripheral Component Interconnect (PCI) bus standard or the Universal Serial Bus (USB) standard, for example. In some embodiments, the function of Interconnect 1090 may be split into two or more separate components, such as a north bridge and a south bridge, for example. In addition, in some embodiments some or all of the functionality of Interconnect 1090, such as an interface to system memory 1010, may be incorporated directly into processor 1070.

Network interface 1050 may be configured to allow data to be exchanged between computer system 1000 and other devices attached to a network, such as other computer systems, or between nodes of computer system 1000. In various embodiments, network interface 1050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1080 may, in some embodiments, include one or more display terminals, keyboards, keypads, touchpads, scanning devices, voice or optical recognition devices, or any other devices suitable for entering or retrieving data by one or more computer system 1000. Multiple input/output devices 1080 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1050.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A system, comprising:
   at least one processor
   a memory, comprising a first least recently used (LRU) queue comprising a plurality of nodes, a second LRU queue, and program instructions that when executed by the at least one processor cause the at least one processor to:
   move a node of the plurality of nodes from the first LRU queue to the front of the second LRU queue, wherein to move the node, the program instructions cause the at least one processor to:
   remove the node from the first LRU queue, wherein the removal holds respective locks on the node and a predecessor node in the first LRU queue until the predecessor node points to a successor node of the node as a next node in the first LRU queue and the successor node points to the predecessor node as a node immediately prior to the successor node in the first LRU queue; and
   add the node as front node to the second LRU queue, wherein the addition locks a dummy node that points to a current front node of the second LRU queue until:
   a previous node pointer of the current front node points to the node;
   a previous node pointer of the node points to the dummy node; and
   a next node pointer of the node points to the current front node.

2. The system of claim 1, wherein to hold the respective lock on the node in the first LRU queue, the program instructions cause the at least one processor to set a lock bit in the successor node to identify the node as locked in the first LRU queue.

3. The system of claim 2, wherein to remove the node from the first LRU queue, the program instructions cause the at least one processor to unset the lock bit in the successor node to identify the node as unlocked.

4. The system of claim 3, wherein the lock bit is unset without using a compare and swap (CAS) operation.

5. The system of claim 1, wherein to hold the respective lock on the predecessor node in the first LRU queue, the program instructions cause the at least one processor to write a null value as a next node pointer of the predecessor node.

6. The system of claim 1, wherein to lock the dummy node that points to the current front node of the second LRU queue, the program instructions cause the at least one processor to write a null value as a next node pointer of the dummy node.

7. The system of claim 6, wherein to add the node as the front node to the second LRU queue, the program instructions cause the at least one processor to further perform a compare and swap (CAS) operation to replace a null value stored as the next node pointer of the dummy node with a pointer to the node in order to unlock the dummy node.

8. A method, comprising:
   performing, by one or more computing devices:
   moving a node from a first Least Recently Used (LRU) queue to the front of a second LRU queue, comprising:
   removing the node from the first LRU queue, wherein the removing comprises holding respective locks on the node and a predecessor node in the first LRU queue until the predecessor node points to a successor node of the node as a next node in the first LRU queue and the successor node points to the predecessor node as a node immediately prior to the successor node in the first LRU queue; and
   adding the node as front node to the second LRU queue, wherein the adding comprises locking a dummy node that points to a current front node of the second LRU queue until:
   a previous node pointer of the current front node points to the node;
   a previous node pointer of the node points to the dummy node; and
   a next node pointer of the node points to the current front node.

9. The method of claim 8, wherein holding the respective lock on the node in the first LRU queue comprises setting a lock bit in the successor node to identify the node as locked in the first LRU queue.

10. The method of claim 9, wherein removing the node from the first LRU queue further comprises unsetting the lock bit in the successor node to identify the node as unlocked.

11. The method of claim 10, wherein the lock bit is unset without using a compare and swap (CAS) operation.

12. The method of claim 8, wherein holding the respective lock on the predecessor node in the first LRU queue comprises writing a null value as a next node pointer of the predecessor node.

13. The method of claim 8, wherein locking the dummy node that points to the current front node of the second LRU queue comprises writing a null value as a next node pointer of the dummy node.

14. The method of claim 13, wherein adding the node to the front node to the second LRU queue further comprises performing a compare and swap (CAS) operation to replace a null value stored as the next node pointer of the dummy node with a pointer to the node in order to unlock the dummy node.

15. One or more non-transitory, computer-readable storage media, storing program instructions that when executed on or across one or more computing devices cause the one or more computing devices to implement:
   moving a node from a first Least Recently Used (LRU) queue to the front of a second LRU queue, wherein the program instructions cause the one or more computing devices to implement:
   removing the node from the first LRU queue, wherein the removing comprises holding respective locks on the node and a predecessor node in the first LRU queue until the predecessor node points to a successor node of the node as a next node in the first LRU queue and the successor node points to the predecessor node as a node immediately prior to the successor node in the first LRU queue; and adding the node as front node to the second LRU queue, wherein the adding comprises locking a dummy node that points to a current front node of the second LRU queue until:
- a previous node pointer of the current front node points to the node;
- a previous node pointer of the node points to the dummy node; and
- a next node pointer of the node points to the current front node.

16. The one or more non-transitory, computer-readable storage media of claim 15, wherein, in holding the respective lock on the node in the first LRU queue, the program instructions cause the one or more computing devices to implement setting a lock bit in the successor node to identify the node as locked in the first LRU queue.

17. The one or more non-transitory, computer-readable storage media of claim 16, wherein, in removing the node from the first LRU queue, the program instructions cause the one or more computing devices to further implement unsetting the lock bit in the successor node to identify the node as unlocked.

18. The one or more non-transitory, computer-readable storage media of claim 17, wherein the lock bit is unset without using a compare and swap (CAS) operation.

19. The one or more non-transitory, computer-readable storage media of claim 15, wherein, in locking the dummy node that points to the current front node of the second LRU queue, the program instructions cause the one or more computing devices to further implement writing a null value as a next node pointer of the dummy node.

20. The one or more non-transitory, computer-readable storage media of claim 19, wherein, in adding the node to the front node to the second LRU queue further, the program instructions cause the one or more computing devices to further implement performing a compare and swap (CAS) operation to replace a null value stored as the next node pointer of the dummy node with a pointer to the node in order to unlock the dummy node.

* * * * *

UNITED STATES PATENT AND TRADEMARK OFFICE
CERTIFICATE OF CORRECTION

PATENT NO. : 11,442,871 B2
APPLICATION NO. : 17/079361
DATED : September 13, 2022
INVENTOR(S) : Lev et al.

It is certified that error appears in the above-identified patent and that said Letters Patent is hereby corrected as shown below:

In the Specification

In Column 4, Line 6, delete ""prey")" and insert -- "prev") --, therefor.

In Column 4, Line 26, delete ""prey"" and insert -- "prev" --, therefor.

In Column 6, Line 27, delete "prey" and insert -- prev --, therefor.

In Column 6, Line 32, delete "prey" and insert -- prev --, therefor.

In Column 6, Line 42, delete "prey" and insert -- prev --, therefor.

In Column 7, Line 62, delete "(from" and insert -- from --, therefor.

In Column 9, Line 52, delete "prey" and insert -- prev --, therefor.

In Column 10, Line 49, delete "itself)." and insert -- itself. --, therefor.

In Column 11, Line 59, delete "the these" and insert -- these --, therefor.

In Column 14, Line 34, delete "Interconnect" and insert -- interconnect --, therefor.

In Column 14, Line 39, delete "Interconnect" and insert -- interconnect --, therefor.

In Column 14, Line 43, delete "Interconnect" and insert -- interconnect --, therefor.

In Column 14, Line 48, delete "Interconnect" and insert -- interconnect --, therefor.

In Column 14, Line 51, delete "Interconnect" and insert -- interconnect --, therefor.

Signed and Sealed this
Fourteenth Day of February, 2023

Katherine Kelly Vidal
*Director of the United States Patent and Trademark Office*